(12) United States Patent
Ryu et al.

(10) Patent No.: US 8,149,321 B2
(45) Date of Patent: Apr. 3, 2012

(54) CAMERA MODULE AND METHOD OF MANUFACTURING THE SAME

(75) Inventors: Jin Mun Ryu, Gyeonggi-do (KR); Jung Jin Kim, Gyeonggi-do (KR); Bo Kyoung Kim, Gyeonggi-do (KR); Jae Sub Cho, Gyeonggi-do (KR)

(73) Assignee: Samsung Electro-Mechanincs Co., Ltd., Suwon (KR)

( * ) Notice: Subject to any disclaimer, the term of this patent is extended or adjusted under 35 U.S.C. 154(b) by 979 days.

(21) Appl. No.: 12/081,218

(22) Filed: Apr. 11, 2008

(65) Prior Publication Data

US 2008/0252775 A1 Oct. 16, 2008

(30) Foreign Application Priority Data

Apr. 12, 2007 (KR) .................. 10-2007-0035979

(51) Int. Cl.
*H04N 5/225* (2006.01)
(52) U.S. Cl. ........................................ 348/340; 348/374
(58) Field of Classification Search .................. None
See application file for complete search history.

(56) References Cited

U.S. PATENT DOCUMENTS

| | | | | |
|---|---|---|---|---|
| 7,391,466 B2 * | 6/2008 | Machida | ...................... | 348/374 |
| 7,444,073 B2 * | 10/2008 | Lee | .................. | 396/72 |
| 7,528,880 B2 * | 5/2009 | Yamaguchi et al. | .......... | 348/335 |
| 7,639,936 B2 * | 12/2009 | Lin | .................. | 396/87 |
| 7,650,067 B2 * | 1/2010 | Chiang | .......... | 396/144 |
| 7,714,931 B2 * | 5/2010 | Singh et al. | .......... | 348/374 |
| 2007/0165136 A1 * | 7/2007 | Wu et al. | ............. | 348/373 |
| 2009/0015706 A1 * | 1/2009 | Singh | ............. | 348/340 |
| 2010/0053423 A1 * | 3/2010 | Singh | ............. | 348/374 |

FOREIGN PATENT DOCUMENTS

| | | |
|---|---|---|
| JP | 2004-229167 | 8/2004 |
| KR | 10-2005-0117371 | 12/2005 |
| KR | 10-2006-0094247 | 8/2006 |

* cited by examiner

*Primary Examiner* — Justin P Misleh

(57) ABSTRACT

Provided is a camera module including a housing that is formed in a rectangular box shape and has a cylindrical barrel coupling portion extending upward from the central portion thereof; an image sensor module that is mounted in the housing; a lens barrel that has a lens insertion port provided in the central portion thereof and a housing coupling portion extending downward therefrom, the housing coupling portion being closely coupled to the barrel coupling portion of the housing; a wafer lens that is mounted in the lens insertion port of the lens barrel; and a lens fixing cap that is covered on the upper end portion of the lens barrel.

21 Claims, 7 Drawing Sheets

[FIG. 1]
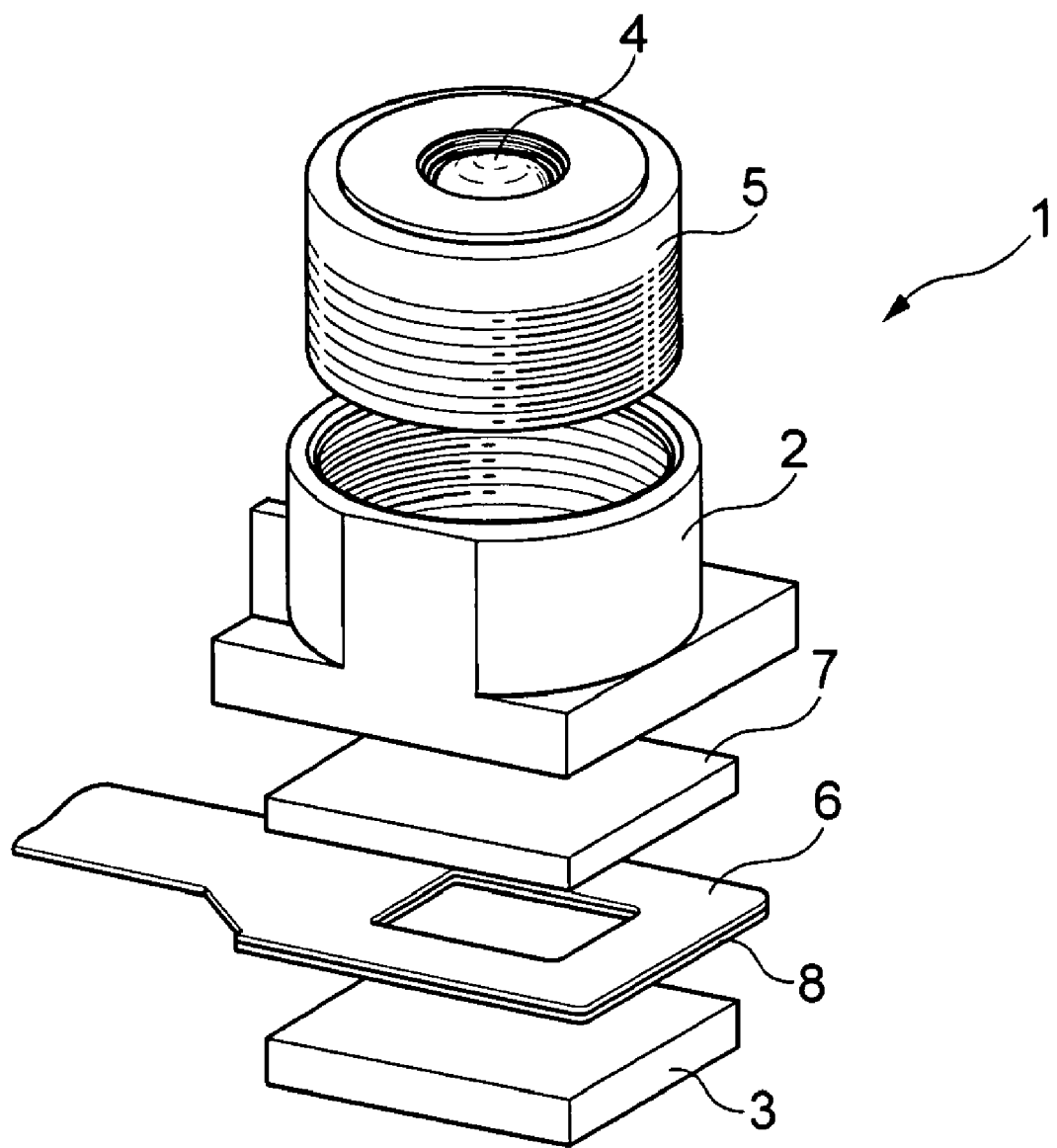
- PRIOR ART -

[FIG. 2]
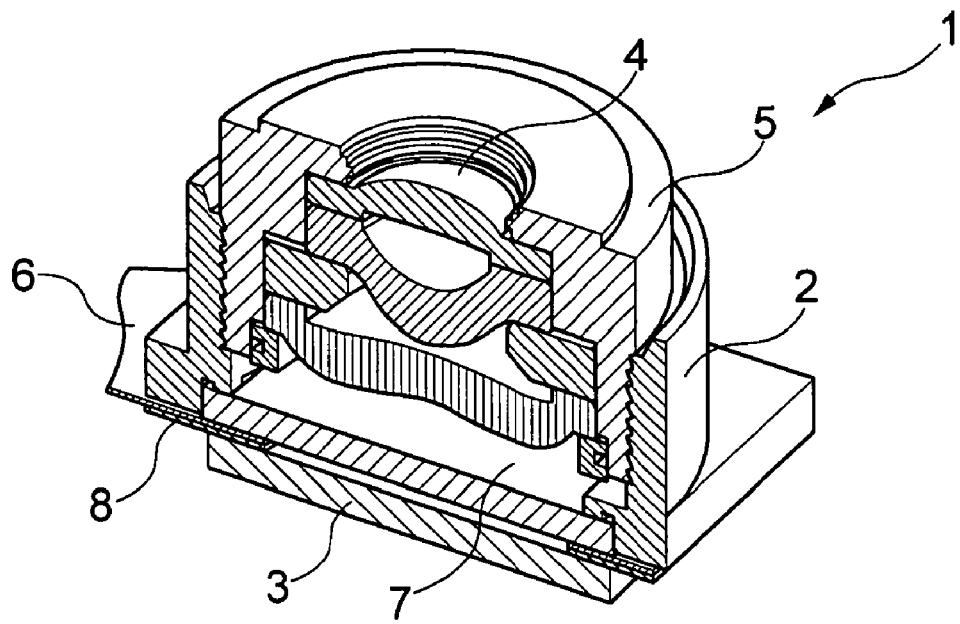
- PRIOR ART -
[FIG. 3]
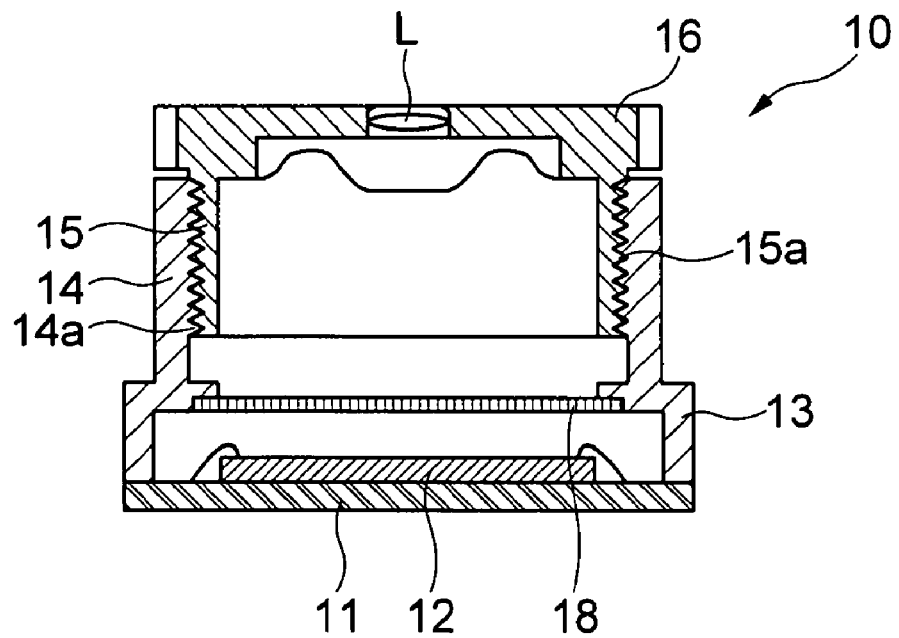
- PRIOR ART -

[FIG. 4]
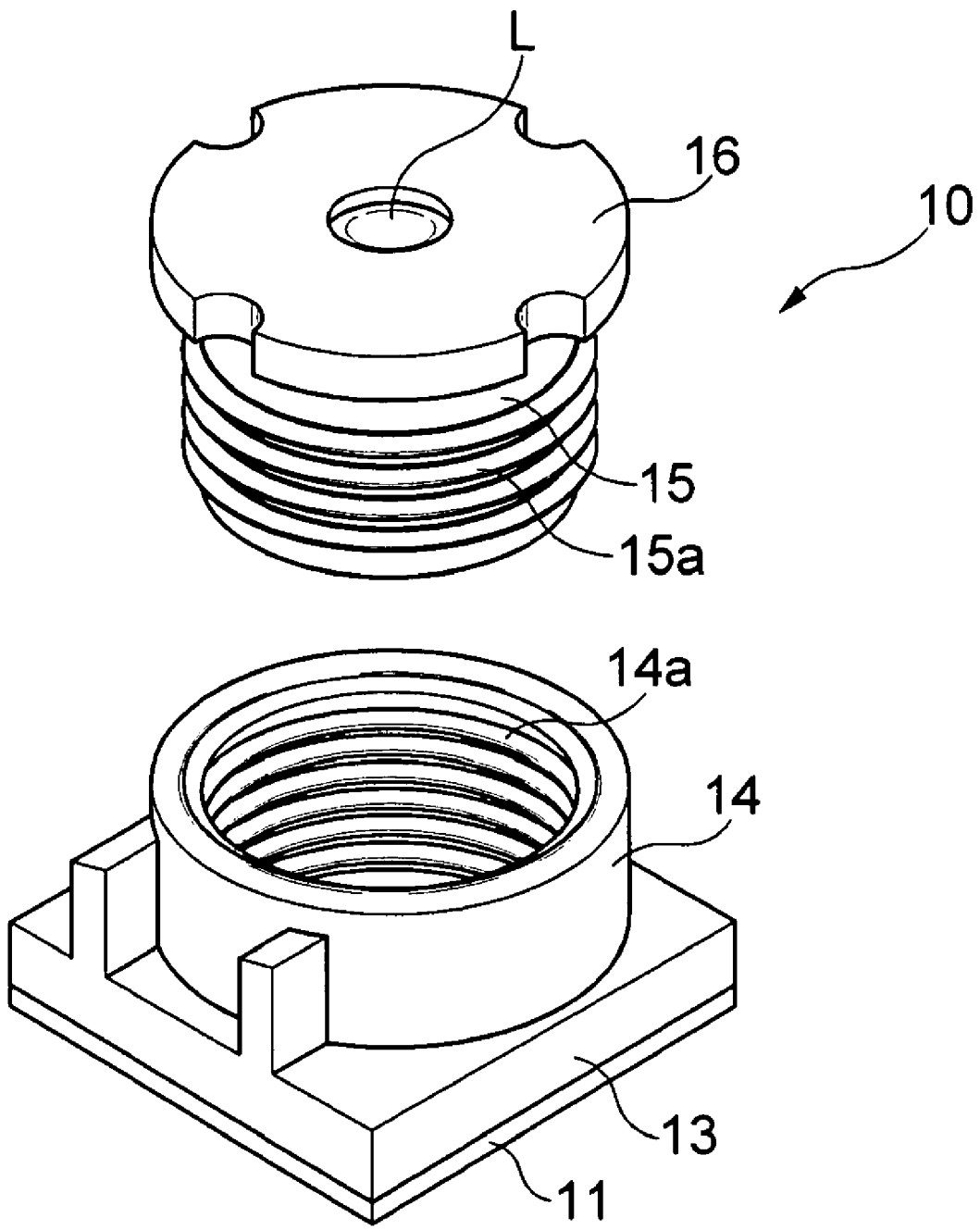
- PRIOR ART -

[Fig. 5]
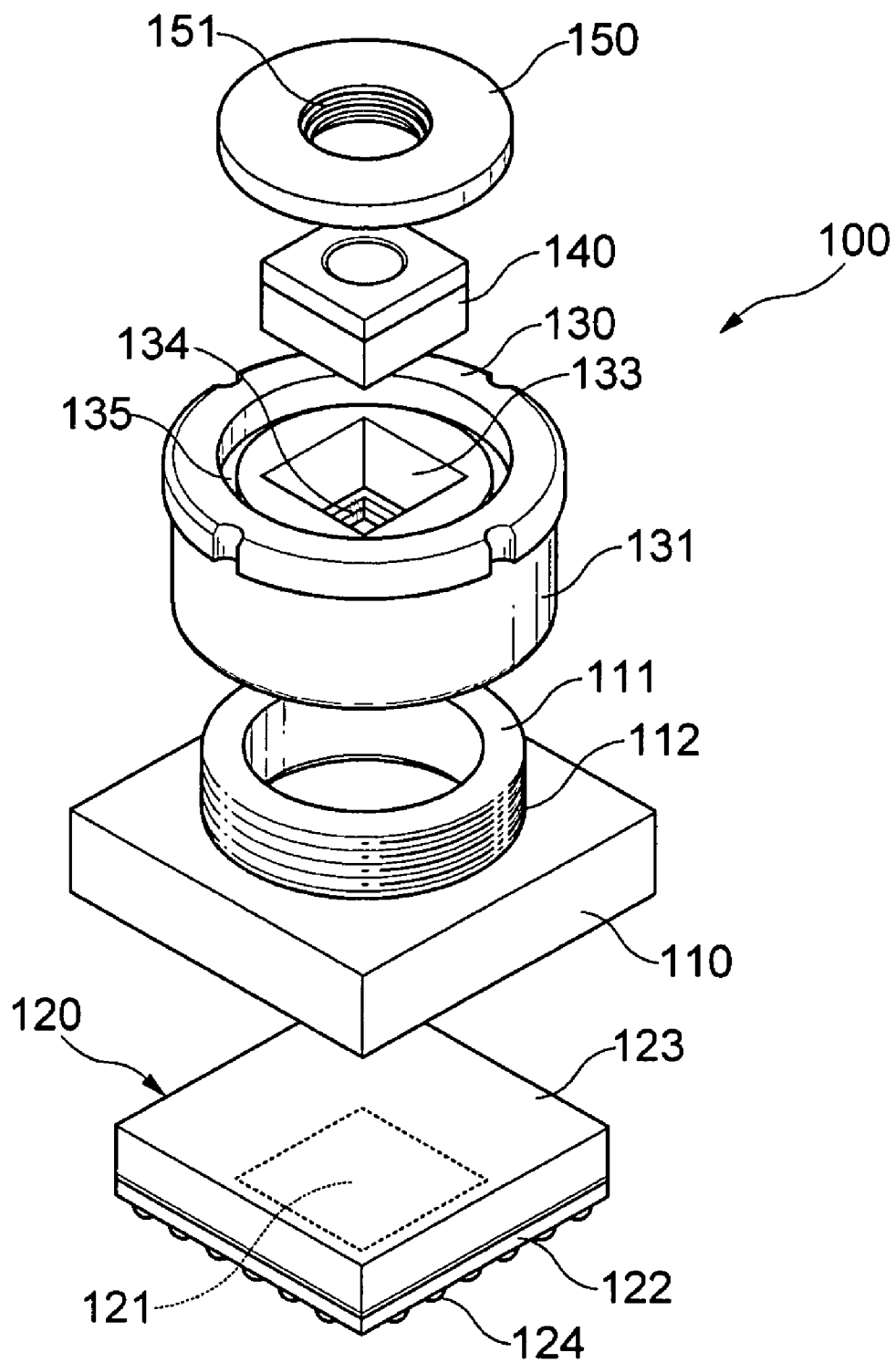

[Fig. 6]
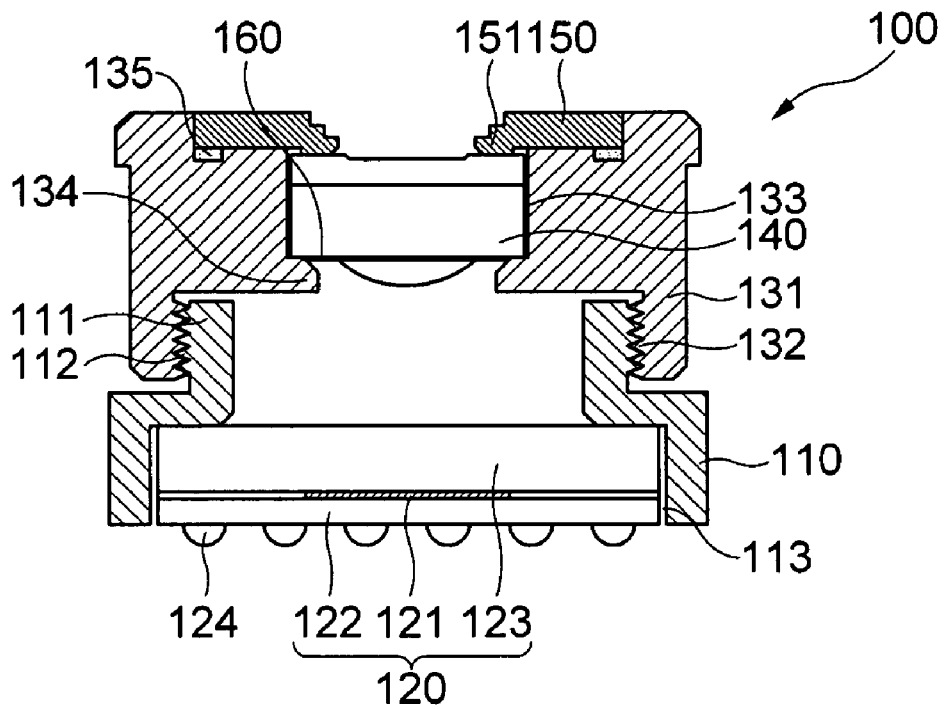
[Fig. 7]
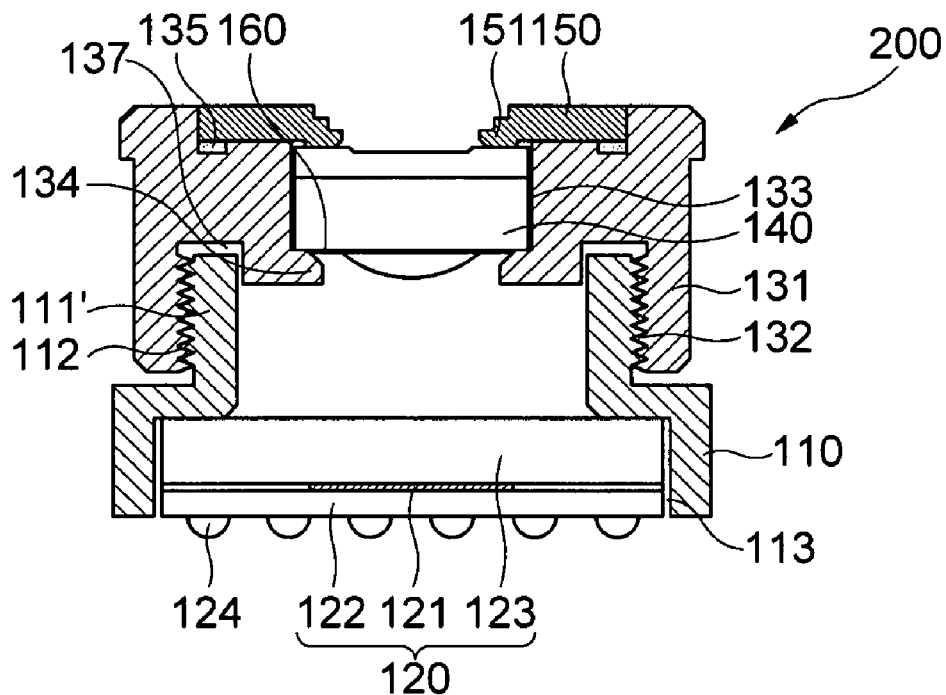

[Fig. 8]
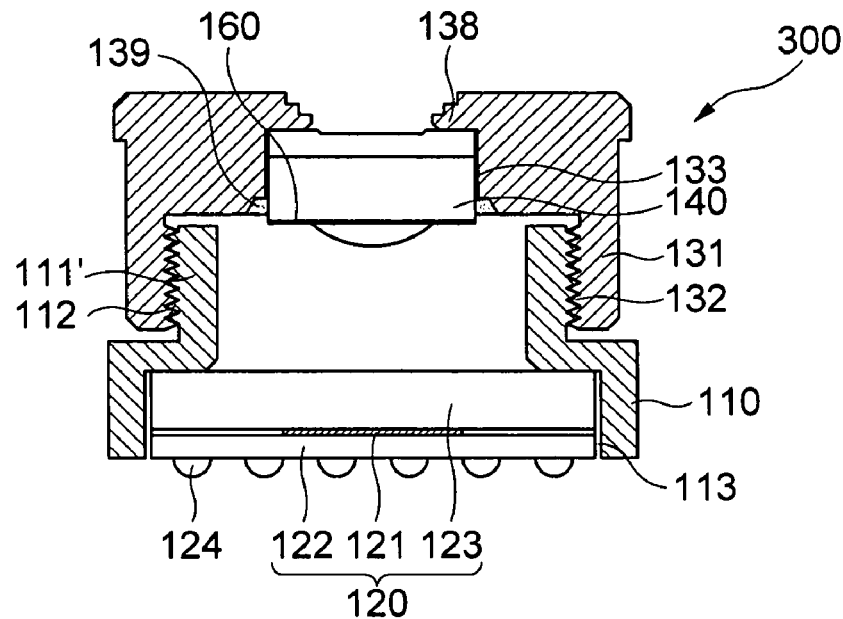
[Fig. 9A]
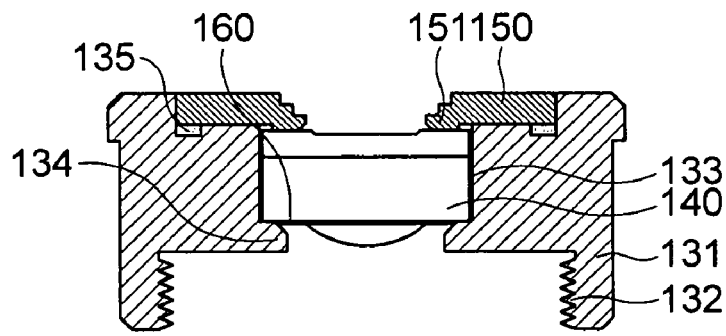
[Fig. 9B]
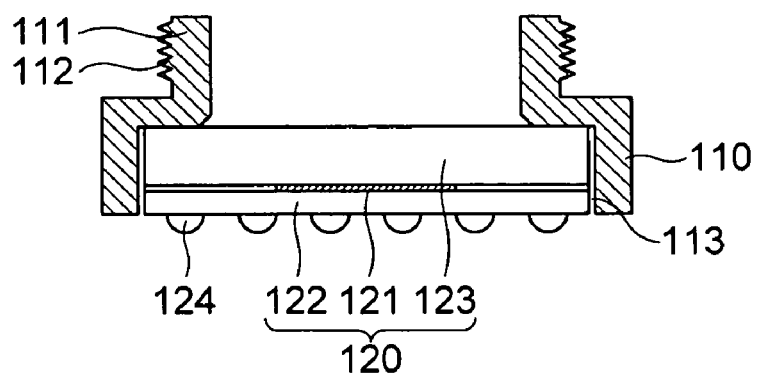

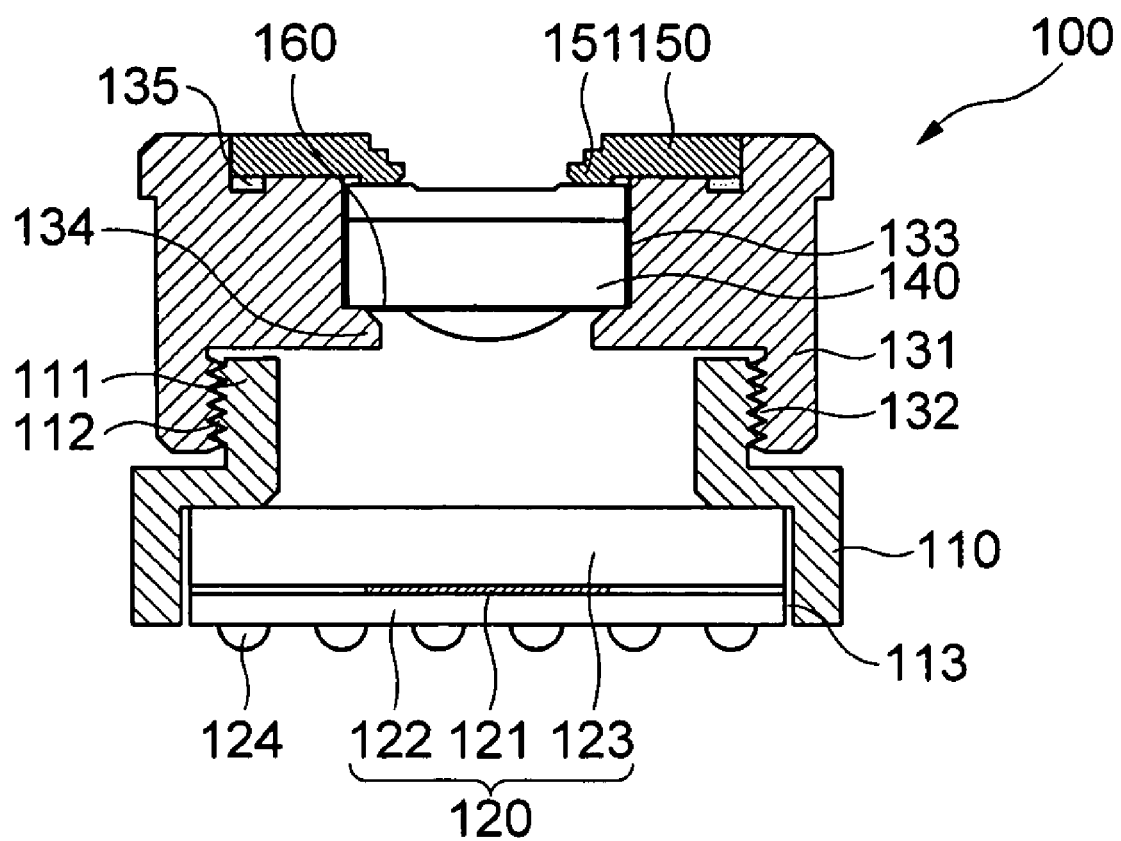
[Fig. 9C]

CAMERA MODULE AND METHOD OF MANUFACTURING THE SAME

CROSS-REFERENCE TO RELATED APPLICATIONS

This application claims the benefit of Korean Patent Application No. 10-2007-0035979 filed with the Korea Intellectual Property Office on Apr. 12, 2007, the disclosure of which is incorporated herein by reference.

BACKGROUND OF THE INVENTION

1. Field of the Invention

The present invention relates to a camera module and a method of manufacturing the same.

2. Description of the Related Art

Recently, camera modules are mounted on IT devices such as mobile terminals, PDAs (Personal Digital Assistant), MP3 players and so on. With the development of technology, the resolution of the camera modules changes from 300,000 pixels (VGA) to several million pixels, and the reduction in size and thickness of the camera modules are being performed depending on mounting targets. Further, the camera module provides various additional functions, such as auto-focusing (AF) and optical zoom.

In such camera modules, image sensor modules are mounted, which are manufactured by a COF (Chip On Film) method, a COB (Chip On Board) method, and a CSP (Chip Scale Package) method. The image sensor module is connected to a main substrate through an electrical connection unit such as a PCB (Printed Circuit Board) or FPCB (Flexible Printed Circuit Board).

Recently, however, there is demand for a camera module which can be directly mounted on a main substrate together with general passive elements, thereby simplifying a manufacturing process and reducing a manufacturing cost.

The camera modules are manufactured in such a manner that CCD (Charge Coupled Device) or CMOS (Complementary Metal Oxide Semiconductor) image sensors are attached on a substrate by a wire bonding method or flip-chip method. Incident light transmitted through the lens is condensed by the image sensor and is stored as data in a memory. The stored data is displayed as an image through a display medium, such as liquid crystal display (LCD) or PC monitor.

The COF method and the COB method will be described with reference to drawings.

FIG. 1 is an exploded perspective view of a conventional COF type camera module, and FIG. 2 is a partial sectional view of the conventional COF type camera module of FIG. 1.

Referring to FIGS. 1 and 2, the conventional camera module 1 includes an image sensor 3 for converting an image signal inputted through a lens into an electric signal, a housing 2 for supporting the image sensor 3, a lens group 4 for collecting an image signal of an object into the image sensor 3, and a barrel 5 in which the lens group 4 is stacked in multi-layers.

An FPCB (Flexible Printed Circuit Board) 6 is electrically connected to a lower portion of the housing 2. Chip components (e.g., condensers and resistors) for driving the CCD or CMOS image sensor 3 are mounted on the FPCB 6.

In the camera module 1 constructed in such a manner, an ACF (Anisotropic Conductive Film) 8 is inserted between the FPCB 6 and the image sensor 3 in such a state that a plurality of circuit components are mounted on the FPCB 6. Then, heat and pressure are applied to electrically attach the FPCB 6 to the image sensor 3, and an IR filter 7 is attached on the FPCB 6.

Furthermore, in such a state that the barrel 5 and the housing 2 are provisionally screwed to each other, the assembled FPCB 6 is fixed to the bottom surface of the housing 2 by a separate adhesive.

Meanwhile, after the housing 2 to which the FPCB 6 and the barrel 5 are coupled is fixed by an adhesive, an object (resolution chart) is set at a predetermined distance in front of the barrel 5 so as to perform focus adjustment. The focus adjustment of the camera module 1, that is, the focus adjustment between the lens group 4 and the image sensor 3 is performed as a vertical transfer amount of the barrel 5 is adjusted by rotating the barrel 5 screwed to the housing 2.

At this time, the focus adjustment is performed in a state where the distance from the object is set at 50 cm to the infinity. After the focus is finally adjusted, the housing 2 and the barrel 5 are bonded and fixed to each other by an adhesive injected therebetween.

However, when the barrel 5 screwed to the housing 2 is rotated and vertically transferred in order to adjust the focus of an image formed in the image sensor 3 after the barrel 5 having the lens group 4 mounted therein is assembled into the housing 2, foreign matters such as particles, generated by friction at the screw-coupling portion between the barrel 5 and the housing 2, drop down onto the upper surface of the IR filter 7 or the image sensor 3.

Further, the assembling of the FPCB 6 and the housing 2 is determined on the basis of the IR filter 7, which means that the IR filter 7 plays an important roll of adjusting the centers of the image sensor 3 and the lens group 4. Therefore, the mounting position of the IR filter 7 has a large effect upon foreign matters.

That is, as the IR filter 7 is mounted adjacent to the image sensor 3, foreign matters dropping onto the upper surface of the IR filter 7 can be easily recognized. On the contrary, as the IR filter 7 becomes distant from the image sensor 3, an effect caused by foreign matters becomes insensible. Therefore, the camera module needs to be designed in such a manner that the IR filter 7 and the image sensor 3 are spaced at a proper distance from each other.

FIGS. 3 and 4 are diagrams showing a camera module manufactured by the COB method. FIG. 3 is a cross-sectional view of a conventional camera module manufactured by the COB method, and FIG. 4 is an exploded perspective view of the camera module.

In the conventional camera module 10, a printed board 11 having a CCD or CMOS image sensor 12 mounted thereon by wire bonding is coupled to a lower portion of a housing 13 formed of plastics, and a lens barrel 16 having a cylindrical body 15 extending downward is coupled to a barrel 14 extending upward from the housing 13.

In the camera module 10, the housing 13 and the lens barrel 16 are coupled to each other by coupling a female screw portion 14a formed on the inner circumferential surface of the barrel 14 to a male screw 15a formed on the outer circumferential surface of the cylindrical body 15.

At this time, an infrared ray (IR) filter 18 is disposed between a lens L mounted in a lower end portion of the lens barrel 16 and the image sensor 12 attached on the printed board 11, the IR filter 18 cutting off long-wavelength infrared rays incident on the image sensor 12.

In the camera module assembled in such a manner, while light incident from a specific object passes through the lens L, an image is inverted so that the focus is adjusted on the surface of the image sensor 12. At this time, when a focus is optimally adjusted by rotating the lens barrel 16 screwed to the upper end of the housing 13, an adhesive is injected between the housing 13 and the lens barrel 16 such that the housing 13 and the lens barrel 16 are bonded to each other. Then, the camera module is finalized.

Recently, as the resolution and the number of pixels of cameras demanded by users gradually increase, disposal of foreign matters occurring from materials during a manufacturing process is emphasized.

However, there is a limit in securing materials from which foreign matters do not occur at all. Further, as regulations for foreign matter management of materials are tightened, the price of materials inevitably increases, thereby increasing the price of products.

Therefore, to minimize an increase in price of products, materials and parts which are being widely used are utilized. When camera modules are assembled or an inspection process such as image inspection is performed, the following problems occur.

In the conventional camera module, the coupling between the barrel 16 and the housing 13 for performing the focus adjustment is carried out by the rotational structure constructed by the male and female screws 14a and 15a inside the camera module. Therefore, as the coupling portion is abraded by the friction between the male and female screws 14a and 15a, minute particles P occur, thereby considerably degrading an assembling characteristic.

The particles P occurring between the housing 13 and the lens barrel 16 inevitably drop onto the top surface of the IR filter 18 or enter the light receiving region of the image sensor 12. Therefore, when an image is reproduced through the image sensor 12, the particles P may be seen as black spots.

SUMMARY OF THE INVENTION

An advantage of the present invention is that it provides a camera module and a method of manufacturing the same, in which a lens barrel and a housing are screw-coupled to each other on the outer circumference of the housing, and a CSP-type image sensor module is mounted in the lower portion of the housing, thereby preventing foreign matters from entering the camera module. Further, the camera module is directly mounted on a substrate so as to be bonded by a reflow process such that a process loss caused by bonding a separate connection element can be reduced.

Additional aspects and advantages of the present general inventive concept will be set forth in part in the description which follows and, in part, will be obvious from the description, or may be learned by practice of the general inventive concept.

According to an aspect of the invention, a camera module comprises a housing that is formed in a rectangular box shape and has a cylindrical barrel coupling portion extending upward from the central portion thereof; an image sensor module that is mounted in the housing; a lens barrel that has a lens insertion port provided in the central portion thereof and a housing coupling portion extending downward therefrom, the housing coupling portion being closely coupled to the barrel coupling portion of the housing; a wafer lens that is mounted in the lens insertion port of the lens barrel; and a lens fixing cap that is covered on the upper end portion of the lens barrel.

According to another aspect of the invention, a camera module comprises a housing that is formed in a rectangular box shape and has a cylindrical barrel coupling portion extending upward from the central portion thereof, the barrel coupling portion having a male screw portion formed on the outer circumference thereof; an image sensor module that is mounted in the housing; a lens barrel that has a housing coupling portion having a female screw portion, which is closely coupled to the barrel coupling portion so as to extend downward, a lens insertion port having a rib which is formed in the central portion thereof so as to extend inward, and a circular groove formed on the bottom surface of the lens barrel outside the rib; a wafer lens that is mounted in the central portion of the lens barrel; and a lens fixing cap that is covered on the upper end portion of the lens barrel.

According to a further aspect of the invention, a camera module comprises a housing that is formed in a rectangular box shape and has a cylindrical barrel coupling portion extending upward from the central portion thereof, the barrel coupling portion having a male screw portion formed on the outer circumference thereof; an image sensor module that is mounted in the housing; a lens barrel that has a housing coupling portion having a female screw portion, which is closely coupled to the barrel coupling portion so as to extend downward, a lens insertion port having a rib which is formed in the central portion thereof so as to extend inward, a lens supporting portion which is formed in the upper portion so as to extend inward, and an adhesive injection port provided on the lower periphery of the lens insertion port; and a wafer lens that is mounted in the central portion of the lens barrel.

According to a still further aspect of the invention, a method of manufacturing a camera module comprises the steps of: inserting and fixing a wafer lens to a lens insertion port formed in the central portion of a lens barrel; mounting an O-ring-shaped lens fixing cap on the upper end portion of the lens barrel; mounting an image sensor module into a housing to which the lens barrel is coupled; coupling the lens barrel and the housing through the screw coupling between male and female screw portions formed on the inner and outer circumferences of a barrel coupling portion and a housing coupling portion, respectively; rotating the lens barrel in one direction in the upper portion of the housing to adjust a distance between the wafer lens and an image sensor, thereby performing focus adjustment; when the focus adjustment is completed, fixing the lens barrel by using epoxy or an UV (ultra-violet) adhesive, and mounting the camera module, in which the focus adjustment is completed, on a main substrate; and mounting passive elements including the camera module on the main substrate, and then soldering the passive elements to the main substrate through a reflow process.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is an exploded perspective view of a conventional COF type camera module;

FIG. 2 is a partial sectional view of the conventional COF type camera module of FIG. 1;

FIG. 3 is a cross-sectional view of a conventional camera module manufactured by a COB method;

FIG. 4 is an exploded perspective view of the camera module of FIG. 3;

FIG. 5 is an exploded perspective view of a camera module according to a first embodiment of the invention;

FIG. 6 is a cross-sectional view of the camera module of FIG. 5;

FIG. 7 is a cross-sectional view of a camera module according to a second embodiment of the Invention;

FIG. 8 is a cross-sectional view of a camera module according to a third embodiment of the invention; and FIGS. 9A to 9C are process diagrams showing a method of manufacturing a camera module.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a camera module and a method of manufacturing the same according to the present invention will be described in detail with reference to the accompanying drawings.

Structure of Camera Module

[First Embodiment]

FIG. 5 is an exploded perspective view of a camera module according to a first embodiment of the invention. FIG. 6 is a cross-sectional view of the camera module of FIG. 5.

The camera module 100 according to this embodiment includes a housing 110 having a CSP-type image sensor module 120 built therein and a lens barrel 130 having a wafer lens 140 inserted into the central portion thereof.

The CSP-type image sensor module is manufactured by a manufacturing process in which a plurality of chips are mounted on a wafer through a lamination process, die bonding or wire bonding is performed, a molding or the like is assembled through an assembling process, and the wafer is then diced.

The upper end portion of the housing 110 is coupled to the lower end portion of the lens barrel 130. In this state, while the lens barrel 130 is vertically transferred in the upper portion of the housing 110, a distance adjustment is performed to adjust the focus of the wafer lens 140 with respect to an image sensor 121 of the image sensor module 120.

The housing 110 is formed in a box shape of which the lower portion is opened and has a cylindrical barrel coupling portion 111 formed on the center of the top surface thereof so as to extend upward, the barrel coupling portion 111 having a male screw portion 112 formed on the outer circumference thereof.

The housing 110 of which the lower portion is opened is usually manufactured through injection molding. The image sensor module 120 is inserted and fixed to an opening 113 formed in the lower portion of the housing 110.

Inside the housing, the image sensor module 120 is mounted in a state where the bottom surface thereof is exposed. Therefore, the image sensor module 120 can be directly mounted on a main substrate or the like.

The image sensor module 120 includes a wafer 122 having the image sensor 121 provided on the top surface thereof, a glass 123 received on the wafer 122 such that an air cavity is provided therebetween, and a plurality of electrical connection elements 124 such as solder balls, pads, or bumps formed on the bottom surface of the wafer 122.

The housing 110 having the image sensor module 120 mounted therein is directly received on a main substrate (not shown) and is then bonded and fixed on the main substrate by a reflow process in which the bottom surface of the image sensor module 120 is directly soldered to the top surface of the substrate while the housing 110 passes through a reflow furnace which maintains a predetermined temperature.

Therefore, the camera module 100 can be mounted through SMT without a separate connection element such as a socket or an FPCB for electrically connecting the camera module 100 to the main substrate.

Meanwhile, the lens barrel 130 coupled to the upper end of the housing 110 includes a housing coupling portion 131 extending downward and a lens insertion port 133 provided in a the central portion thereof. The housing coupling portion 131 has a female screw portion 132 provided on the inner circumference thereof, and the wafer lens 140 is inserted into the lens insertion port 133.

The lens barrel 130 is formed in a cylindrical shape so as to be coupled to the barrel coupling portion 111. Further, the shape of the lens insertion port 133 formed in the lens barrel 130 may differ depending on the shape of the wafer lens 140. In this embodiment, since the wafer lens 140 cut in a rectangular shape is mounted, the lens insertion port 133 is formed of a rectangular groove or hole.

The lens insertion port 133 has a rib 134 formed in the lower portion thereof, the rib 134 extending inward. The bottom surface of the wafer lens 140 is received on the rib 134 such that the wafer lens 140 is fixed to the lens barrel 130.

The lens barrel 130 has an O-ring-shaped lens fixing cap 150 coupled to the upper portion thereof such that the wafer lens 140 built in the lens insertion port 133 is fixed and external light is incident only through the central portion of the wafer lens 140.

The lens fixing cap 150 has a lens supporting portion 151 formed on the inner circumference thereof. As a portion of the lens support portion 151 presses the top surface of the wafer lens 140, the wafer lens 140 is reliably fixed. The lens fixing cap 150 is fixed by an adhesive injected into an adhesive injection groove 135 provided on the top surface of the lens barrel 130.

The lens fixing cap 150 has a multistage step portion which is inclined so as to induce light incident from outside into the central portion of the wafer lens 140. The lens fixing cap 150 is formed of a black material such that stray light is not incident through other portions excluding the central portion of the wafer lens 140.

The wafer lens 140 mounted in the lens barrel 130 is manufactured in a wafer-level state by a replica method using a heat-resistant material which can endure a high temperature of 300° C. Typically, the wafer lens 140 is cut in a rectangular shape.

The top or bottom surface of wafer lens 140 is deposited or coated with an IR filter layer 160. Therefore, a separate IR filter for cutting off infrared rays included in incident light received by the image sensor 121 is not mounted in the housing 110 and the lens barrel 130.

Meanwhile, the housing 110 and the lens barrel 130 are coupled to each other in such a state that the wafer lens 140 and the image sensor module 120 are mounted in the housing 110 and the lens barrel 130, respectively. Therefore, the barrel coupling portion 111 which extends upward from the housing 110 is closely coupled to the housing coupling portion 131 which extends downward from the lens barrel 130.

The housing 110 and the lens barrel 130 are fixed to each other by the screw coupling between the male screw portion 112 formed in the housing coupling portion 131 and the female screw portion 132 formed in the housing coupling portion 131. As the lens barrel 130 is rotated in the upper portion of the housing 130, the lens barrel 130 is vertically transferred so as to adjust the distance between the wafer lens 140 and the image sensor 121. Then, the focus adjustment is achieved.

As the screw coupling between the housing 110 and the lens barrel 130 is performed on the outer circumference of the housing 130, foreign matters which may occur in the screw coupling portion are previously prevented from entering the camera module 100.

The screw threads of male screw portion 112 and the female screw portion 132, which are formed to couple the housing 110 and the lens barrel 130, should have at least 3 pitches such that the focus adjustment is smoothly performed when the lens barrel 130 is vertically transferred.

Then, when the focus adjustment is performed by one-direction rotation in a state where the lens barrel 130 is coupled to the upper portion of the housing 110 such that the upper end of the barrel coupling portion 111 of the housing 110 is closely attached to the bottom surface of the lens barrel 130, an accurate focus-adjusted position can be found with a sufficient transfer distance within the focus-adjustment distance of the wafer lens 140.

Therefore, it is preferable that the screw threads of the male screw portion 112 and the female screw portion 132 are set to have at least 3 pitches of which each is set to 0.25 μm, in consideration of the focus-adjustment distance.

[Second Embodiment]

FIG. 7 is a cross-sectional view of a camera module according to a second embodiment of the invention.

Like the camera module 100 according to the first embodiment, the camera module 200 according to the second embodiment of the invention includes a housing 110 having a CSP-type image sensor module 120 built therein and a lens barrel 130 having a wafer lens 140 inserted into the central portion thereof.

In this embodiment, the duplicated descriptions of the same construction as that of the first embodiment will be omitted. Further, like reference numerals will be attached to the same components as those of the first embodiment.

The lens barrel 130 coupled to the upper portion of the housing 110 has a rib 134 extending to the inside of a lens insertion port 133 formed in the central portion of the lens barrel 130 and a circular groove 137 provided on the bottom surface of the lens barrel 130 outside the rib 134.

As shown in FIG. 7, a barrel coupling portion 111' formed in the housing 110 of this embodiment is formed to be longer than the barrel coupling portion 111 formed in the housing 110 of the first embodiment. Further, the upper end of the barrel coupling portion 111' is inserted into the circular groove 137 formed on the bottom surface of the lens barrel 130 such that the increased length of the barrel coupling portion 111' can be covered.

That is, the circular groove 137 serves to enhance the mountability of the barrel coupling portion 111', in a state where the length of the housing coupling portion 131 extending downward from the lens barrel 130 is limited to a predetermined length.

The reason why the length of the barrel coupling portion 111' inserted into the circular groove 137 is increased is as follows. As the height of the camera module is limited because of reduction in thickness, the screw coupling portion between the housing 110 and the lens barrel 130 should be prevented from being reduced. Further, in order to secure at least 3 pitches, the pitch should be prevented from decreasing to less than 0.25 μm.

As described above, the housing 110 and the lens barrel 130 are coupled to each other through the screw coupling between the male screw portion 112 and the female screw portion 132. In this case, as the pitch of the screw threads forming the respective screw portions 112 and 132 is small, the vertical transfer amount of the lens barrel 130 which is rotationally transferred decreases. Accordingly, the rotation amount of the lens barrel 130 for adjusting the focus of the wafer lens 140 increases.

Therefore, as the pitch of the screw coupling portion between the housing 110 and the lens barrel 130 is small, time required for focus adjustment is lengthened, thereby degrading a mass production property. For such a reason, it is most effective that the screw threads of the screw coupling portion secure at least 3 pitches of which each is set to 0.3 μm.

To secure screw threads with at least 3 pitches of which each is set to 0.3 μm, the housing 110 should have the barrel coupling portion 111' of which the length is increased as shown in FIG. 7. Accordingly, the circular groove 137 is formed on the bottom surface of the lens barrel 130 such that when the housing 110 and the lens barrel 130 are coupled, the upper end of the lens barrel coupling portion 111' is inserted into the circular groove 137. That is, the circular groove 137 serves to enlarge the transfer range of the lens barrel 130.

[Third Embodiment]

FIG. 8 is a cross-sectional view of a camera module according to a third embodiment of the invention.

Like the camera module according to the first and second embodiments, the camera module 300 according to the second embodiment of the invention includes a housing 110 having a CSP-type image sensor module 120 built therein and a lens barrel 130 having a wafer lens 140 inserted into the central portion thereof.

In this embodiment, the duplicated descriptions of the same construction as that of the first and second embodiments will be omitted. Further, like reference numerals will be attached to the same components as those of the first and second embodiments.

The housing 110 having the CSP-type image sensor module 120 built therein is formed in a box shape and has a barrel coupling portion 111' having a male screw portion 112 provided on the outer circumference thereof, the barrel coupling portion 111' extending upward from the center of the top surface of the housing 110. The screw threads of the male screw portion 112 formed on the outer circumference of the barrel coupling portion 111' is formed to have at least 3 pitches of which each is set to 0.3 μm. Further, a female screw portion 132 formed on a housing coupling portion 131 of the lens barrel 130 has the same number of screw threads and pitches.

The lens barrel 130 coupled to the upper end of the housing 110 has a lens supporting portion 138 formed over a lens insertion port 133 into which the wafer lens 140 is inserted, the lens supporting portion 138 extending inward. Further, the lens barrel 130 has an adhesive injection port 139 formed on the lower inner periphery of the lens insertion port 133.

The wafer lens 140 inserted into the lens barrel 130 is closely coupled to the lens insertion port 133, as an adhesive injected into the adhesive injection port 139 is solidified. The edge of the upper end of the wafer lens 140 excluding the central portion on which external light is incident is supported by the lens supporting portion 138.

In the camera module 300 according to third embodiment, the barrel coupling portion 111' has the same length as that of the barrel coupling portion 111' of the camera module 200 according to the second embodiment. The bottom surface of the lens barrel 130 is set to be flush with the bottom surface of the wafer lens 140 inserted into the lens barrel 130. That is, the rib 134 formed in the camera modules 100 and 200 according to the first and second embodiment is removed, and the supporting of the lens 140 is performed by the solidification of the adhesive injected into the adhesive injection port 139.

Therefore, while the camera module 300 has the same height as that of the camera module 110 according to the first embodiment, the number of rotations of the lens barrel 130 is reduced by the increased number of pitches of screw threads, thereby reducing the focus-adjustment time. Further, since the bottom-surface structure of the lens barrel 130 is simplified, a mold can be simplified, which makes it possible to reduce a manufacturing cost.

Method of Manufacturing Camera Module

Referring to FIGS. 9A to 9C, a method of manufacturing the camera module will be described.

FIGS. 9A to 9C are process diagrams showing a method of manufacturing a camera module. FIG. 9A is a cross-sectional view of a lens barrel, FIG. 9B is a cross-sectional view of a housing, and FIG. 9C is a cross-sectional view of a camera module in which the lens barrel and the housing are coupled to each other.

The assembling sequence of the method is based on the camera module 110 according to the first embodiment.

As shown in the drawings, the wafer lens 140 which is diced in a rectangular shape is inserted and fixed to the lens insertion port 133 formed in the cylindrical lens barrel 130, and the ring-shaped lens fixing cap 150 is coupled to the upper end portion of the lens barrel 130.

At this time, the lower end of the wafer lens 140 is received on the top surface of the rib 134 extending toward the inside of the lens insertion port 133.

Further, before the lens fixing cap 150 is covered on the upper end portion of the lens barrel 130, an adhesive is injected through the adhesive injection port 135 formed in the upper portion of the lens barrel 130. As the adhesive is solidified, the fixing of the lens fixing cap 150 is achieved. Accordingly, the lens supporting portion 151 of the lens fixing cap 150 supports the top surface of the wafer lens 140.

Meanwhile, the CSP-type image sensor module 120 is inserted into the box-shaped housing 110 through the opening 113 formed in the lower portion of the housing 110. At this time, the electrical connection elements 124 formed on the bottom surface of the image sensor module 120 are exposed through the bottom surface of the housing 110.

The lens barrel 130 and the housing 110 assembled in such a manner are coupled to each other by the screw coupling between the male and female screw portions 112 and 132 which are formed on the inner and outer circumferences of the barrel coupling portion 111 and the housing coupling portion 131, respectively.

Next, as the lens barrel 130 is rotated in one direction in the upper portion of the housing 110, the distance between the wafer lens 140 and the image sensor 121 is adjusted so as to perform focus adjustment.

Then, when the focus adjustment is completed, the lens barrel 130 is fixed by epoxy or an ultra violet (UV) adhesive. The camera module 110 in which the focus adjustment is completed is mounted on a main substrate (not shown).

Subsequently, passive elements including the camera module 100 are mounted on the main substrate and are then passed through a reflow furnace of which the inside is heated at a predetermined temperature (170-180° C.). Then, bonding is achieved.

At this time, the electrical connection elements 124, such as solder balls, pads, or bumps, exposed through the bottom surface of the housing 110 are electrically bonded to the main substrate. Then, the bonded portions are soldered by heat generated during the reflow process such that the camera module 100 can be surface-mounted through SMT.

According to the present invention, the housing and the lens barrel are coupled by the screw coupling between the male and female screw portions on the outer circumference of the housing. Therefore, foreign matters, which may occur when the housing and lens barrel are assembled and the focus adjustment is performed, can be previously prevented from entering the camera module.

Further, the CSP-type image sensor module is mounted in the housing such that the electrical connection elements such as solder balls are exposed through the lower portion of the housing. Therefore, the camera module can be directly surface-mounted on a main substrate through SMT and can be easily bonded through the reflow process. Accordingly, a separate connection element for electrical connection is not needed, which makes it possible to reduce a manufacturing cost and a process loss.

Furthermore, the wafer lens mounted in the camera module is manufactured by the replica method using a heat-resistant material which can endure high heat with a temperature of 300° C., when the camera module is surface-mounted through the reflow process. Therefore, the camera module can be surface-mounted without damage of the lens, when passing through the reflow in which the inner temperature is maintained at 170-180° C.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A camera module comprising:
   a housing that is formed in a rectangular box shape and has a cylindrical barrel coupling portion extending upward from a central portion thereof;
   an image sensor module that is mounted in the housing;
   a lens barrel that includes:
      a lens insertion port provided in a central portion of the lens barrel; and
      a housing coupling portion extending downward from the lens barrel, the housing coupling portion being closely coupled to the barrel coupling portion of the housing;
   a wafer lens that is mounted in the lens insertion port of the lens barrel; and
   a lens fixing cap that is covered on the upper end portion of the lens barrel,
   wherein a male screw portion is formed on an outer circumference of the cylindrical barrel coupling portion and a female screw portion is formed on an inner circumference of the housing coupling portion, and
   wherein the housing and the lens barrel are coupled to each other by screw-coupling between the male screw portion and the female screw portion.

2. The camera module according to claim 1, wherein a focus of the wafer lens is adjusted by vertically transferring the lens barrel in an upper portion of the housing.

3. The camera module according to claim 1, wherein the housing has an opening formed in the lower portion thereof such that the image sensor module is inserted and fixed through the opening, and the bottom surface of the image sensor module is exposed to a lower portion of the housing.

4. The camera module according to claim 1, wherein the image sensor module is a CSP (Chip Size Package)-type image sensor module which is manufactured by a manufacturing process in which a plurality of chips are mounted on a wafer through a lamination process, die bonding or wire bonding is performed, a molding or the like is assembled through an assembling process, and the wafer is then diced.

5. The camera module according to claim 4, wherein the image sensor module includes:
a wafer that has an image sensor provided on a top surface of the wafer;
a glass that is received on the wafer such that an air cavity is provided between the glass and the wafer; and
a plurality of electrical connection elements that are composed of solder balls, pads, or bumps and are formed on a bottom surface of the wafer.

6. The camera module according to claim 1, wherein the wafer lens is manufactured in a wafer-level state by injection molding through a replica method using a heat-resistant material and is cut in a rectangular shape.

7. The camera module according to claim 6, wherein the wafer lens has an IR (Infrared Ray) filter layer deposited or coated on the top or bottom surface thereof.

8. The camera module according to claim 1, wherein the lens barrel has a rib formed in the lower portion of the lens insertion port, the rib inwardly extending, and a bottom surface of the wafer lens that is inserted into the lens insertion port is received on the rib.

9. The camera module according to claim 8, wherein the lens fixing cap is fixed by an adhesive injected into an adhesive injection groove provided on a top surface of the lens barrel.

10. The camera module according to claim 8, wherein the lens fixing cap has a multistage step portion formed in a central portion thereof and is formed of a black material such that stray light is not incident.

11. The camera module according to claim 1, wherein screw threads of the male and female screw portions have at least 3 pitches of which each is set to 0.25 μm.

12. The camera module according to claim 1, wherein the camera module is directly surface-mounted on a main substrate and is then soldered to the main substrate by a reflow process.

13. A camera module comprising:
a housing that is formed in a rectangular box shape and has a cylindrical barrel coupling portion extending upward from a central portion thereof, the cylindrical barrel coupling portion having a male screw portion formed on an outer circumference thereof;
an image sensor module that is mounted in the housing;
a lens barrel that has a housing coupling portion having a female screw portion, which is closely coupled to the barrel coupling portion so as to extend downward, a lens insertion portion having a rib which is formed in a central portion thereof so as to extend inward, and a circular groove formed on a bottom surface of the lens barrel outside the rib;
a wafer lens that is mounted in the central portion of the lens barrel; and
a lens fixing cap that is covered on an upper end portion of the lens barrel,
wherein the housing and the lens barrel are coupled to each other by screw-coupling between the male screw portion and the female screw portion.

14. The camera module according to claim 13, wherein the barrel coupling portion has such a length as to be inserted into the circular groove formed on the bottom surface of the lens barrel.

15. The camera module according to claim 13, wherein the housing has an opening formed in a lower portion thereof, through which the image sensor module is inserted and fixed, and a bottom surface of the image sensor module is exposed to a lower portion of the housing.

16. The camera module according to claim 13, wherein the image sensor module includes:
a wafer that has an image sensor provided on a top surface of the wafer;
a glass that is received on the wafer such that an air cavity is provided between the glass and the wafer; and
electrical connection elements that are composed of solder balls, pads, or bumps and are formed on a bottom surface of the wafer.

17. The camera module according to claim 13, wherein the wafer lens is manufactured in a wafer-level state by injection molding through a replica method using a heat-resistant material and is cut in a rectangular shape.

18. The camera module according to claim 17, wherein the wafer lens has an IR filter layer deposited or coated on the top or bottom surface thereof.

19. The camera module according to claim 13, wherein the lens fixing cap has a multistage step portion formed in a central portion thereof and is formed of a black material such that stray light is not incident.

20. The camera module according to claim 13, wherein screw threads of the male and female screw portions have at least 3 pitches of which each is set to 0.3 μm.

21. The camera module according to claim 13, wherein the camera module is directly surface-mounted on a main substrate and is then soldered to the main substrate by a reflow process.

* * * * *

UNITED STATES PATENT AND TRADEMARK OFFICE
CERTIFICATE OF CORRECTION

| | | |
|---|---|---|
| PATENT NO. | : 8,149,321 B2 | |
| APPLICATION NO. | : 12/081218 | |
| DATED | : April 3, 2012 | |
| INVENTOR(S) | : Jin Mun Ryu et al. | |

It is certified that error appears in the above-identified patent and that said Letters Patent is hereby corrected as shown below:

On the Title Page

Item (73) (Assignee), Line 1, Delete "Electro-Mechanincs" and insert -- Electro-Mechanics --, therefor.

Signed and Sealed this
Fourth Day of September, 2012

David J. Kappos
*Director of the United States Patent and Trademark Office*